United States Patent Office 3,786,020
Patented Jan. 15, 1974

3,786,020
CAULKING COMPOSITION COMPRISING POLYMER HAVING ADDITION POLYMERIZED BACKBONE HAVING CARBOXYL GROUPS ESTERIFIED WITH DRYING OIL FATTY ACID GLYCIDYL ESTER
William D. Emmons, Huntingdon Valley, Pa., assignor to Rohm and Haas Company, Philadelphia, Pa.
No Drawing. Filed Sept. 7, 1971, Ser. No. 178,429
Int. Cl. C08g 51/02, 51/04
U.S. Cl. 260—41 A    4 Claims

ABSTRACT OF THE DISCLOSURE

The caulking or sealing composition of the invention has as its binder an acrylic backbone containing pendant unsaturated groups, preferably derived from drying oils or equivalent air curable unsaturated pendant alkyl radicals, and attached to the acrylic backbone through ester linkages. The modified acrylic product has the flexibility and durability characteristic of acrylics, and the advantage that the composition will cure similarly to drying oils, using driers such as cobalt naphthenate and zinc naphthenate.

---

This invention relates to caulking, sealing, or putty compositions.

There are many types of caulking compounds including those in which the binder is such that they are surface drying. This includes drying by oxidation or by solvent release. The permanently plastic binders comprise another category. Other types of caulking compounds are those which are catalytically cured and those which are heat convertible. The disadvantage of the drying oil type, which drys by oxidation, is that the oil may bleed from the composition, before it is cured, be absorbed by porous substrates such as wood, and ultimately the drying reaction is carried to such an extent that the products become brittle and sometimes extremely hard. This makes replacement of the caulking very difficult.

The present invention provides a combination of types of cure and provides a combination of properties which could be said to be a permanently plastic product which cures by an oxidation reaction of unsaturated groups on the permanently plastic polymer, and preferably also by solvent evaporation. Basically, the product comprises an addition polymer backbone such as an acrylic backbone which has groups attached thereto through esterification of carboxyl groups on the backbone by a fatty acid glycidyl ester, the fatty acid having an unsaturated group curable by a drying or oxidative mechanism. The binder for the caulking compound has units of the following structure:

$$-(X)-\left[\begin{array}{c} R^5 \ \ R^1 \\ | \ \ \ | \\ CH-C- \\ | \\ C=O \\ | \\ O \\ | \\ R^3 \\ | \\ O \\ | \\ C=O \\ | \\ R^4 \end{array}\right]\left[\begin{array}{c} R^5 \ \ R^1 \\ | \ \ \ | \\ CH-C- \\ | \\ C=O \\ | \\ OR^3 \end{array}\right] \quad I$$

wherein $R^1$ is H, lower alkyl of up to about 4 carbons, such as methyl or butyl, or less preferably halogen,

—CH$_2$COOR,

—COOR, or —CH$_2$COOH, R being lower alkyl of from 1 to 8 carbon atoms;

$R^2$ is —CH$_2$—CH—CH$_2$— or —CH—CH$_2$;
    |             |
    OH          CH$_2$OH $R^3$ being at least one of H and at least one lower alkyl having from 1 to 8 carbon atoms; examples being methyl, hexyl, and octyl, at least a portion of $R^3$ being H to give free carboxyl groups;

$R^4$ is an unsaturated air curable alkyl radical having up to about 22 carbon atoms, preferably from a drying oil fatty acid, and preferably a minimum of about 10 carbons;

$R^5$ is H, —COOH, —CONH$_2$, or —COOR, wherein R is as above, $R^5$ preferably being H; and X is derived from at least one copolymerizable optional vinyl monomer (defined hereinbelow) other than the one or ones from which the right hand parenthetical group $$\left[\begin{array}{c} R^5 \ \ R^1 \\ | \ \ \ | \\ CH-C- \\ | \\ C=O \\ | \\ OR^3 \end{array}\right] \quad II$$

is derived. It is to be understood that when $R^1$ and/or $R^5$ contain a free carboxyl group (—COOH), the glycidyl ester will react therewith to give pendant ester groups equivalent to the structure of Formula V, below.

The units in parentheses are in any order.
Examples of $R^1$ and $R^5$ are:

| $R^1$ | $R^5$ | Acid for carboxyl source |
|---|---|---|
| H | H | Acrylic. |
| CH$_3$ | H | Methacrylic. |
| H | COOH | Maleic, fumaric. |
| H | CONH$_2$ | Maleamic. |
| Cl | COOH | Chloromaleic. |
| CH$_2$COOCH$_3$ | H | Methyl acid itaconate. |
| CH$_2$COOH | H | Itaconic. |
| CH$_2$COOH | COOH | Aconitic. |
| H | COOCH$_3$ | Methyl acid maleate. |

The matter in the right-hand parenthetical group, of course, represents that portion of the addition polymerized polymer backbone having free carboxyl groups as well as carboxyl groups which are esterified by the various alcohols conventionally used. The optional portion -(X)- is derived from any of the well-known unsaturated addition polymerizable vinyl monomers, in addition to those which give units of Formula II, above.

The backbone polymer before esterification by the glycidyl ester, has the formula $$-(X)-\left[\begin{array}{c} R^5 \ \ R^1 \\ | \ \ \ | \\ CH-C- \\ | \\ C=O \\ | \\ OR^3 \end{array}\right] \quad III$$

and the glycidyl ester has the formula $$\underset{CH_2}{\overset{O}{\diagdown}}\!\!-\!\!CHCH_2O-\overset{O}{\underset{\|}{C}}-R^4 \quad IV$$

wherein the symbols used have the same meaning as given above.

An essential characteristic of the ultimate elastomeric polymer obtained by esterifying pendant —COOH groups of the backbone by reaction with the unsaturated glycidyl ester, as concerns caulks, is that there be less than about 10 percent, and more preferably less than about 5 percent, on a weight basis, of the groups represented by the formula:

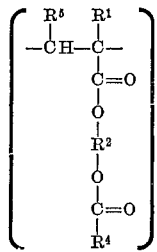

If this criterion is not observed, over a long period of time the caulk may become too brittle or hard for proper expansion and contraction of abutting surfaces in contact with a single caulk bead, or the bead may become so hard as to preclude easy repair. Without a silane of the type used in solvent-based caulks, wet adhesion on upright surfaces may be defective, especially if more than 5 percent of said groups by weight is present. For proper adhesion of the caulk and for other advantageous properties, it is essential to have free carboxyl groups along with the pendant ester groups.

The backbone polymer is a water-insoluble vinyl polymer containing the requisite proportion of free carboxyl (—COOH) groups as described herein.

The proportions of monomers in the backbone are such that there is at least 0.25 percent and no more than 25 percent of unsaturated carboxylic acid, by weight, in the monomers going into said backbone polymer. A preferred range is from about 1 percent to 5 percent, and the optimum is considered to be in the range of 1.5 percent to 3.5 percent. In reacting the glycidyl ester of the unsaturated fatty acid with free carboxyl (—COOH) groups in the backbone polymer, the mole ratio of

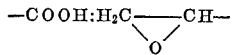

is in the range of from 1:0.2 to 1:0.9, preferably from 1:0.3 to 1:0.7. A particularly useful range is from 1:0.4 to 1:0.6. It is essential to have a substantial proportion of free carboxyl groups for proper adhesion and, for maximum long-term flexibility necessary in the cured caulks, a minimum of the drying oil functionality.

Hard monomers such as styrene or methyl methacrylate are useful in the range of 0 to 90 percent, preferably 5 to 25 percent, with soft monomers such as ethyl or butyl acrylate forming from about 75 percent to about 99.75 percent of the total monomers, preferably 70 to 94 percent.

As stated above, the backbone polymers are those of vinyl addition polymer type, including as an essential component the $\alpha,\beta$-unsaturated carboxylic acid, preferably acrylic acid or methacrylic acid. Other useful copolymerizable acids are named in U.S. Pats. Nos. 3,098,760 and 3,261,796, additional examples being given below.

To amplify, the unsaturated carboxylic acid may be a simple monocarboxylic acid, a polycarboxylic acid, or may be a partial ester or half amide of such $\alpha,\beta$-unsaturated polycarboxylic acids, and salts thereof with a volatile base such as ammonia, or with a volatile water-soluble amine such as dimethylamine, triethylamine, triethanolamine, morpholine, N-methyl morpholine, picoline, and the like. Examples of copolymerizable ethylenically unsaturated monocarboxylic or polycarboxylic acids are sorbic, acryloxyacetic, acryloxypropionic, cinnamic, vinyl furoic, $\alpha$-chlorosorbic, methacryloxypropionic, methacryloxyacetic, p-vinylbenzoic, acrylic, methacrylic, maleic, fumaric, aconitic, atropic, crotonic, and itaconic acid, or mixtures thereof, with itaconic acid and the $\alpha,\beta$-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid malete. Such partial esters and partial amides are considered to be "$\alpha,\beta$-unsaturated monocarboxylic acids," and the term as used herein includes such esters and amides.

The term "vinyl monomer" as used herein means a monomer comprising at least one of the following groups:

vinylidene: $CH_2=C<$,
vinyl: $CH_2=CH—$, and
vinylene: $—CH=CH—$, whether homopolymerizable or not, giving units corresponding to X and to Formula II. Examples are the $\alpha,\beta$-ethylenically unsaturated monocarboxylic acids and esters and amides thereof, $\alpha,\beta$-ethylenically unsaturated aldehydes, $\alpha,\beta$-ethylenically unsaturated dicarboxylic acids and esters, amides, half esters, and half amides thereof, $\alpha,\beta$-ethylenically unsaturated nitriles, hydrocarbons such as $\alpha$-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing ($HN<$) groups, and halogen, hydroxyalkyl, or aminoalkyl substituted derivatives thereof, whether homopolymers or copolymers. The vinyl polymers and methods for their preparation form no part of the present invention, and any such polymer may be treated in accordance with the present invention. For examples of well-known vinyl polymers and methods of preparing the same, see "Polymer Processes," Schildknecht, Interscience, N.Y. (1956), pp. 111–174. Mixtures of different polymers are useful.

Specific examples of suitable monomers which may be copolymerized to obtain the water-insoluble polymers for use according to the invention in addition to the unsaturated acid monomers and esters thereof with alkanols having 1 to 20 carbon atoms, such as methanol, ethanol, butanol, pentadecanol and the like, are acrolein, methacrolein, ethylene, propylene, isobutene, butadiene, isoprene, chloroprene, styrene, vinyl-toluene, vinyl methyl ether, vinyl isobutyl ether, vinyl chloride, vinyl bromide, vinylidene chloride, vinyl sulfide, vinyl acetate, vinyl propionate, the vinyl pyridines, primary amino compounds such as $\beta$-aminoethyl vinyl ether, aminopentyl vinyl ether, secondary amino-containing compounds such as secondary amyl t-butyl aminoethyl methacrylate, tertiary amino-containing compounds such as t-dimethylaminoethyl methacrylate, and the allied amine salts such as the chloride or hydroxide, ureido monomers such as are disclosed in U.S. Pats. Nos. 2,881,155 to Hankins, 3,300,429 to Glavis and Keighly, and 3,356,627 to Scott, examples being $\beta$-ureidoethyl acrylate, $\beta$-(N,N'-ethyleneureido)ethyl acid maleate, $\beta$-ureidoethyl vinyl ether, N-vinyl-N,N'-ethyleneurea, N - vinyloxyethyl - N,N'-ethyleneurea, N-methacrylamidomethyl - N,N' - ethyleneurea, and N-dimethylaminoethyl - N' - vinyl - N,N' - ethyleneurea, $\beta$-hydroxyethyl methacrylate, N-hydroxyethylacrylamide, N - methylolacrylamide, and N - (dimethylaminoethyl) acrylamide. Copolymers, and graft, block, or segmented polymers are included. Conventional methods of obtaining the backbone polymers are utilized.

As is described below, these vinyl monomers include the acids mentioned above and esters thereof, as well as known "soft" and "hard" monomers.

Another of the important, and at times essential monomers, in addition to the acid monomer, usually utilized in a substantial proportion to prepare the backbone polymer is a resiliency-imparting or "soft" monomer which may be represented by the following formula:

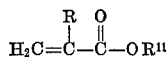

wherein R is H or alkyl having 1 to 4 carbon atoms and $R^{11}$ is the straight chain or branched chain radical of a primary or secondary alkanol, alkoxyalkanol or alkylthiaalkanol, and having up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2 - methylpentyl, methoxymethyl, ethoxyethyl, cyclohexyl, n-hexyl, isobutyl, ethylthiaethyl, methylthiaethyl, ethylthiapropyl, n-octyl, 6-methylnonyl, decyl, dodecyl, and the like, said radicals $R^{11}$, when alkyl, having from 2 to about 14 carbon atoms, preferably from 3 to 12 carbon atoms, when R is H or methyl. When R is alkyl and $R^{11}$ is alkyl, $R^{11}$ should have from about 6 to about 14 carbon atoms and when R is H and $R^{11}$ is alkyl, $R^{11}$ should have from about 2 to about 12 carbon atoms, in order to qualify as a soft monomer.

Other ethylenically unsaturated copolymerizable vinyl monomers, the homopolymers of which have a much higher $T_g$, are used in combinations with the above mentioned soft monomers provided they do not adversely affect the desired properties of the caulk (e.g., unduly raise the overall $T_g$). The "hard" acrylics may be represented by the formula

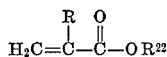

wherein R is as above. $R^{22}$ is preferably alkyl and is methyl or alkyl having from about 13 to about 20 carbon atoms when R is H, and is alkyl of from 1 to about 5 carbon atoms or alkyl of from about 15 to about 20 carbon atoms when R is methyl. It can be seen from above that for alkyl acrylates and alkyl methacrylates the $T_g$ at first decreases with an increased chain length of the alkyl group and then the $T_g$ again increases; i.e., both hard and soft monomers are known to occur in each group of monomers. Examples of these hard monomers and other hard monomers include: methyl acrylate, acrylamide, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, and N-methylolacrylamide.

As is known, for a given number of carbon atoms in the alcohol moiety, the extent and type of branching markedly influences the $T_g$, the straight chain products giving the lower $T_g$.

As is apparent, an important property of the backbone polymer is the $T_g$ thereof, and consequently the selection of monomers and proportions thereof depends upon their influence on the $T_g$. The $T_g$ of the polymer must be below 10° C., preferably below 0° C. (i.e., it must give a rubbery product) and is more preferably below −10° C. The modified backbone polymer containing the pendant ester groups must also have the same $T_g$ requirements. "$T_g$" is a conventional criterion of polymer hardness and is described by Flory, "Principles of Polymer Chemistry," pp. 56 and 57 (1953), Cornell University Press. See also "Polymer Handbook," Brandrup and Immergut Sec. III, pp. 61–63, Interscience (1966). While actual measurement of the $T_g$ is preferred, it may be calculated as described by Fox, Bull. Am. Physics Soc. 1, 3, p. 123 (1956). Examples of the $T_g$ of homopolymers and the inherent $T_g$ thereof which permits such calculations are as follows:

| Homopolymer of: | $T_g$, °C. |
|---|---|
| n-octyl acrylate | −80 |
| n-decyl methacrylate | −60 |
| 2-ethylhexyl acrylate | −70 |
| n-butyl acrylate | −56 |
| octyl methacrylate | −20 |
| n-tetradecyl methacrylate | −9 |
| methyl acrylate | 9 |
| n-tetradecyl acrylate | 20 |
| t-butyl acrylate | 43 |
| methyl methacrylate | 105 |
| acrylic acid | 106 |

These or other monomers are blended to give the desired $T_g$ of the copolymer.

The polymeric backbone is desirably obtained by solution polymerization of one or more of the ethylenically unsaturated acids with other unsaturated monomers including, among the more preferred vinyl monomers, the esters of acrylic acid or methacrylic acid with benzyl alcohol, phenol, or a saturated monohydric aliphatic alcohol, especially an alkanol, having 1 to 18 carbon atoms, such as cyclopentanol, cyclohexanol, methanol, ethanol, n-propanol, isopropanol, n-butanol, methoxyethanol, ethoxyethanol, methoxyethoxyethanol, ethoxyethoxyethanol, isobutanol, sec-butanol, tert-butanol, any of the pentanols, hexanols, octanols, decanols, dodecanols, hexadecanols, and octadecanols, bearing in mind the required $T_g$ and acid monomer. Other preferred comonomers include acrylonitrile, methacrylonitrile, vinyl acetate, styrene, vinyl toluene (o, m, or p), vinyl chloride or vinylidene chloride.

Particularly preferred are polymers predominantly of an ester of acrylic acid and an alkanol having 1 to 4 carbon atoms, copolymerized with an ester of methacrylic acid and an alkanol having 1 to 4 carbon atoms, methacrylonitrile or acrylonitrile, with methacrylic acid or acrylic acid being copolymerized in smaller amounts. Blends of copolymers may be used.

High molecular weight polymers, e.g., 10,000 to several million, obtained by emulsion or solution polymerization or other methods, and of water-insoluble character when in acid form, are used as the backbone polymer. Preferably, the backbone polymer has a molecular weight of 10,000 to 600,000 or more.

The substrates with which the invention is concerned are all types including siliceous substrates such as glass sheets, fiberglass textiles, asbestos sheets, asbestos cement products, concrete, stone, stucco, slate, sandstone, granite, ceramics, and porcelain; also fiber reinforced plastic articles such as canoes, boathulls, or other formed articles made out of fiber-glass reinforced polyesters or other plastic materials; metals such as aluminum, steel, iron, brass; wood and other structural materials; metal oxide layers such as those of aluminum oxide and iron oxide; leather; textiles of cellulose such as of cotton, linen, silk, wool, rayon, cellulose esters such as cellulose acetate, nylons, polyesters such as polyethylene glycol terephthalate, acrylonitrile polymers, vinylidene chloride polymers and other vinyl or acrylic ester polymers; films, pellicles, sheets and other shaped articles of various plastic systems such as of cellulose ethers or esters including hydroxyethyl cellulose, methyl cellulose, cellulose acetate, cellulose acetate butyrate, polyesters such as polyethylene glycol terephthalate, nylons, vinyl chloride or vinylidene chloride polymers and copolymers, methyl methacrylate polymers and copolymers, aminoplast or phenoplast resin, organopolysiloxane resins or rubber.

The caulks of the present invention are particularly valuable in that they can be used directly on any of the substrates without the need of a priming coat.

The solvents used in the polymerization may be such organic solvents as benzene, toluene, xylene, solvent naphthas of aliphatic, aromatic, or naphthenic type, such as mineral spirits, acetone, dioxane, etc. Of course, other modes of polymerization can be used. The amount of solvent in the final caulk is from 0 percent to 30 percent based on total weight. Preferably, it is from 5 percent to 15 percent.

The fillers are present in an amount of from 10 percent to 90 percent by weight of the total solids in the composition depending upon the consistency desired, the presence or absence of thickening agents, the amount and identity of solvent utilized, and so forth. Suitable fillers include calcite, limestone, mica, talc, asbestos fiber or powder, diatomaceous earth, barytes, alumina, slate flour, calcium silicate, clay, colloidal silica, magnesium carbonate, magnesium silicate, and so on. The amounts of solvent, if any, filler, and polymer solids are such as to give the caulking composition a dough-like consistency.

Among the drying oils from which the drying oil fatty acid glycidyl ester is derived are linseed, tung, tall, safflower, isano, soya, dehydrated castor, maleinized or fumarized linseed, oiticica, palm, peanut, corn, walnut, menhaden, dehydrogenated castor, and cottonseed oils, and similar oils, as well as acids not derived from drying oils and of a synthetic origin, with a carbon chain having unsaturation therein which can be caused to cure in a manner analogous to linseed oil. The preferred oils are those which contain oleic and linoleic acids or linoleic and linolenic acids as the predominant ones. The preparation of the fatty acid glycidyl ester is carried out by well-known procedures as is the esterification of the carboxyl groups on the polymeric backbone. Exemplary of publications describing the preparation of a similar polymer is British Pat. No. 1,060,711. The glycidyl ester may be prepared in the manner taught by U.S. Pat. 3,366,706. The British patent is the same type of polymer generally, although the products taught therein have several defects making them unsuitable for many uses including caulking or sealing compositions. For example, all of the backbone polymers disclosed are brittle or hard polymers. Thus, it appears that the softest polymer of the British patent is described in Example 6, and that would have a glass transition temperature ($T_g$) of about 70° C. The most serious disadvantage is a lack of any recognition of the importance of free carboxyl groups. Most of the examples utilize the glycidyl ester in molar excess over the carboxyl groups. Some examples, including Examples 2, 5, 6, 7, and 13 have a very slight excess of carboxyl groups over epoxy groups reacted therewith, but there is advanced no reason therefor. Most importantly, the only two examples relating to the use of unsaturated glycidyl esters, Examples 14 and 15, teach directly away from the present invention in requiring that approximately a 100 percent molar excess of the glycidyl ester be utilized over that required to react with all of the carboxyl groups in the polymer. One of the most important disadvantages of this lack of acid groups is that such polymers would be quite deficient in adhesion to various substrates.

It is essential that the glycidyl ester of an unsaturated fatty acid can be reacted with the preformed polymer backbone containing carboxyl groups. The simultaneous polymerization of carboxyl-containing monomers such as acrylic acid with glycidyl esters such as glycidyl methacrylate is impractical because they react and crosslink in situ. Also unsatisfactory is the scheme of forming a polymer with glycidyl groups and then esterifying these with the unsaturated fatty acid. This again results in a lack of free carboxyl groups which has a number of disadvantages. It is also important to limit the number of ester groups, because for every esterified carboxyl, a hydroxyl group is formed. The more of these that are present the more likely the polymer is to be sensitive to water in vapor or liquid form.

Any of the conventional driers, such as the linoleates, naphthenates, and resinates of cobalt, zirconium, manganese, lead, cerium, chromium, iron, nickel, uranium, and zinc are suitable.

The amount of drier based on the weight of the glycidyl ester of Formula IV can be as low as 0.05 percent to as high as 3 percent or more. Best results are obtained with combinations of driers, particularly zinc naphthenate and cobalt naphthenate in quite small amounts, for example, from .05 percent to .5 percent of the zinc naphthenate are particularly useful. The amount of drier utilized should be such to minimize dirt pickup by the finished caulk.

It is helpful, in some cases, to utilize a silane to improve wet adhesion to glass by the caulk and also, at times, to utilize plasticizers for providing low temperature flexibility, for example, at −15° F. Suitable silanes include vinyltriethoxysilane, γ - methacryloxypropyltrimethoxysilane, γ-mercaptopropyltrimethoxysilane, γ-glycidoxypropyltrimethoxysilane, β-(3,4-epoxycyclohexyl)ethyltrimethoxysilane, γ-aminopropyltriethoxysilane, and N-(dimethoxymethylsilylisobutyl)ethylenediamine. The silane concentration may be between about 0.05 percent and 0.5 percent. Higher amounts may be used but do not result in proportional improvements in adhesion. Suitable plasticizers include oil-modified sebacic acid alkyds, unmodified sebacic acid alkyds, oil-modified maleic polyesters, etc. It is preferred to use "internal" plasticization by means of soft monomers in the backbone. This provides a product which can be used with less solvent, thus minimizing shrinkage.

To assist those skilled in the art to practice the present invention, the following modes of operation are suggested by way of illustration, parts and percentages being by weight and the temperature in ° C. unless otherwise specifically noted.

(1) A glass-block window is mounted in a wood frame within an opening in a stone wall of a house. The joint between the wood frame and the stone wall and the joint between the peripheral edge of the glass-block assembly and the wood frame are filled with the caulking composition to be tested. Aluminum-glass joints are also caulked. It is then aged and weathered. Accelerated tests are conducted in the laboratory at elevated temperatures.

EXAMPLE 1

Preparation of copolymer backbone

Apparatus is provided equipped with a stirrer, thermometer, inlet and outlet tubes for gas, and a device for admitting reactants. The apparatus is swept with nitrogen and a slow current of this gas is maintained during the polymerization cycle. There are charged to this apparatus 366.0 parts of xyelne which is heated to 140° C. At this reaction temperature, a mixture of 2267.0 parts of butyl acrylate, 425.0 parts of methyl methacrylate, 70.6 parts of acrylonitrile, 70.6 parts of methacrylic acid, 148.0 parts of xylene, and 4.14 parts of a 75 percent solution of t-butyl peracetate in mineral spirits is added over a five-hour period. Subsequently there is added 3.76 parts of t-butyl peracetate and 26.0 parts of xylene over a thirty minute period. The reaction mixture is held at 140° C. for an additional one hour to complete the process. The product is a clear, yellow solution having an approximate viscosity of 120,000 cps. Brookfield at 25° C., at approximately 83.0 percent solids. The monomer weight ratios used are:

| | Parts |
|---|---|
| Methyl methacrylate | 15 |
| Butyl acrylate | 80 |
| Acrylonitrile | 2.5 |
| Methacrylic acid | 2.5 |

EXAMPLE 2

Preparation of the glycidyl ester of linseed oil fatty acid

To a 3-liter glass reaction flask equipped with a stirrer, thermometer, reflux condenser, distillate receiver and nitrogen inlet were charged, 310 parts of linseed oil fatty acid and 900 parts of xylene, under nitrogen. The mixture was heated to 125° C. and maintained at this temperature during the addition of 216 parts of 25 percent sodium methoxide in methanol over a 2 hour period with the simultaneous removal of methanol and xylene. Upon completion of sodium methoxide addition, the reaction temperature was increased to 130° C. and 463 parts of epichlorohydrin and 5.2 parts of tetraethyl ammonium bromide were added to the reaction mixture. The reaction temperature was maintained at 120° C. for ½ hour and then cooled to 90° C. with the subsequent addition of 175 parts of deionized water. The mixture was stirred at 90° C. for ½ hour and then allowed to stand for ½ hour. The bottom layer was removed and top layer was distilled under vacuum at 20 mm. Hg to a pot temperature of 120° C. The liquid was cooled to 5° C. and filtered through a 10–20 micron filter. The total yield of product was 337 parts having a slight haze and amber color. An oxirane oxygen titer of 2.5 to 2.7 meq./g. is typical for the product.

EXAMPLE 3

Preparation of a polymeric sealant from the reaction product of glycidyl fatty acid ester of linseed oil with a copolymer acid functionality (A) To a 5-liter reaction flask equipped with a stirrer, thermometer, condenser, and nitrogen inlet are charged 2758 parts of an acrylic resin (BA/MMA/AN/MAA; 80/15/2.5/2.5 wt. percent composition) having a solids content of 83.4 percent and an acid titer of 0.253 meq./g. The acrylic resin is heated to 110° C. and 120.0 parts of glycidyl fatty acid ester of linseed oil (with an oxirane-oxygen assay of 2.56 meq./g.) and 2.92 parts of tetraethylammonium bromide are added with stirring, in a nitrogen atmosphere. The mixture is heated to 145° C. and maintained at 145° C. for 4 hours. The reaction product, after cooling and filtering at 90° C., is clear amber solution with an acid titer of 0.163 meq./g. at 84.5 percent solids which corresponds to 74.6 percent coreaction.

(B) A coreaction product was prepared according to Example 3A from the following reaction charge: 3036 parts of copolymer (A) and 272 parts of glycidyl fatty acid ester of linseed oil of Example 2 above.

EXAMPLE 4

Preparation of a polymeric sealant from the reaction product of glycidyl fatty acid ester of soybean oil with a copolymer containing acid functionality To a 2-liter reaction flask equipped with a stirrer, thermometer, condenser, and nitrogen inlet are charged 900.0 parts of an acrylic resin (BA/MMA/AN/MAA: 80/15/2.5/2.5 wt. percent composition) having a solids content of 81.9 percent and an acid titer of 0.237 meq./g. The acrylic resin is heated to 110° C. and 39.0 parts of glycidyl fatty acid ester of soybean oil (with an oxirane-oxygen assay of 2.68 meq./g.) and 0.895 part of tetraethyl ammonium bromide are added with stirring. The mixture is heated to 140° C. for four hours, after which, the reaction product is cooled and filtered at 90° C. The product is a clear amber solution with an acid titer of 0.124 meq./g. at 83.2 percent solids which corresponds to 92.8 percent coreaction.

EXAMPLE 5

Preparation of a polymeric sealant from the reaction product of glycidyl fatty acid ester of safflower oil with a copolymer containing acid functionality To a 2-liter reaction flask equipped with a stirrer, thermometer, condenser, and nitrogen inlet are charged 900.0 parts of an acrylic resin (BA/MMA/AN/MAA: 80/15/2.5/2.5 wt. percent composition) having a solids content of 81.6 percent and an acid titer of 0.236 meq./g. The acrylic resin is heated to 110° C. and 39.0 parts of glycidyl fatty acid ester of safflower oil (with an oxirane-oxygen assay of 2.61 meq./g.) and 0.895 part of tetraethylammonium bromide are added with stirring. The mixture is heated to 140° C. for four hours, after which, the reaction is cooled and filtered at 90° C. The product is a clear amber solution with an acid titer of 0.127 meq./g. at 83.1 percent solids which corresponds to 91.5 percent coreaction.

EXAMPLE 6

A typical formulation for preliminary thin film evaluation prior to further evaluation as caulks is as follows:

| | Parts by weight |
|---|---|
| Oil modified polymer (83 percent solids) | 194 |
| Pine Oil No. 230 [a] | 2 |
| Ethylene glycol | 3.4 |
| CaCO$_3$ | 150 |
| Ultrasbestos (floor tile grade)[b] | 6 |
| Texas Talc No. 2619 [c] | 34 |
| Cab-O-Sil M–5 [d] | 10 |
| Xylene | 320 |
| Cobalt naphthenate (6% Co) (1% Co based on Oil)[e]. | |

[a] The Glidden Company.
[b] Johns-Manville.
[c] Whittaker, Clark and Daniels, Inc.
[d] Cabot Corporation, colloidal silica.
[e] "Oil" is material of Formula IV.

(A) The following results are obtained with the formulation, using the oil modified polymer of Example 3A cast into 10-mil test sheets which are exposed to atmospheric air for one week at room temperature.

tensile: 96.7 p.s.i.
elongation: 261 percent
elastic recovery: 61 percent (B) When the same 10-mil test sheet is exposed to hot air at 90° C. for sixteen hours, rather than air drying at ambient temperature, the results are as follows:

tensile strength: 75.9 p.s.i.
elongation: 192 percent
elastic recovery: 81.5 percent (C) Repeating (A) but using the oil-modified polymer of Example 3B gives the following results:

tensile strength: 101 p.s.i.
elongation: 137 percent
elastic recovery: 97.5 percent (D) Repeating (B) but with the modified polymer of Example 3B gives the following values:

tensile strength: 111 p.s.i.
elongation: 117 percent
elastic recovery: 97.6 percent When the unmodified copolymer of Example 1 is used in this formulation, the results are as follows:

| | One week in air | 90° C. for 16 hours |
|---|---|---|
| Tensile strength, p.s.i. | 10 | 8.9 |
| Elongation, percent | 152 | 212 |
| Elastic recovery, percent | 19 | 22.2 |

EXAMPLE 7

A useful formulation for caulks is:

| | Parts |
|---|---|
| Oil modified polymer (83 percent solids) | 2336 |
| Pine Oil No. 230 | 24 |
| Ethylene glycol | 40 |
| CaCO$_3$ | 1800 |
| Ultrasbestos (floor tile grade) | 72 |
| Texas Talc No. 2619 | 408 |
| Cab-O-Sil M–5 | 120 |

Zinc naphthenate (8% Zn) (1% Zn based on oil).
Cobalt naphthenate (6% Co) (0.15% Co based on oil).

(A) The following results are obtained for the above caulk formulation using the oil-modified polymer of Example 3A with the caulk being cast into ¼ inch thick test strips and exposed to hot air at 90° C. for one week.

tensile strength: 47.8 p.s.i.
elongation: 204 percent
elastic recovery: 56.1 percent
shore A hardness: 55

(B) The following results are achieved using the above caulk formulation using the oil-modified polymer of Example 3A cast into ¼ inch thick test strips and exposed to atmospheric air at 20 to 25° C. for 3 months.

tensile strength: 14.8 p.s.i.
elongation: 418 percent
elastic recovery: 73.8 percent

EXAMPLE 8

(A) The following results are obtained for the above caulk formulation using the oil-modified polymer of Example 3B with the caulk being cast into ¼ inch thick test strips and exposed to hot air at 90° C. for one week.

tensile strength: 16.8 p.s.i.
elongation: 262 percent
elastic recovery: 57.8 percent
shore A hardness: 40

(B) The following results are achieved using the above caulk formulation using the oil-modified polymer of Example 3B cast into ¼ inch thick test strips and exposed to atmospheric air at 20 to 25° C. for 3 months.

tensile strength: 33.1 p.s.i.
elongation: 256 percent
elastic recovery: 94.5 percent

EXAMPLE 9

Another typical caulk formulation is:

| | Parts |
|---|---|
| Polymer (83 percent total solids) | 2336 |
| Pine Oil No. 230 | 24 |
| Ethylene glycol | 40 |
| CaCO$_3$ | 1800 |
| Ultrasbestos floor tile grade | 72 |
| Texas Talc No. 2619 | 408 |
| Cab-O-Sil M-5 | 120 |
| Cobalt naphthenate (6 percent concentration) | 2.4 |
| Zinc naphthenate (8 percent concentration) | 12.1 |
| Xylene | 216 |

Similar results to those of the foregoing examples are obtained.

EXAMPLE 10

| Pigmented polymer formulation containing silane adhesion promoters: | Parts by weight |
|---|---|
| Polymer of Example 3A | 2336.0 |
| Camel Carb (CaCO$_3$) | 1800.0 |
| Texas Talc No. 2619 | 408.0 |
| Titanium dioxide (Ti-Pure R-901) | 96.0 |
| Thixatrol ST[a] (Rheology Improver) | 194.0 |
| Cobalt naphthenate (6 percent) | 2.4 |
| Zinc napthenate (8 percent) | 12.1 |
| Xylene | 162.0 |
| Silane[b] | 4.85 |
| Total | 5059.0 |

[a] Baker Castor Oil Company, Bayonne, N.J.
[b] Union Carbide A-151 or A-174.

Mixing procedure (1) Prepare under nitrogen.
(2) Charge Camel Carb, Texas Talc, Thixatrol ST, titanium dioxide and mix for several minutes.
(3) Charge polymer and mix for 50 minutes.
(4) Slurry driers and silane into xylene and add to sealant, mix for 10 minutes.
(5) Package under nitrogen atmosphere.

Using this formulation, excellent dry and wet adhesion to glass is obtained, and the caulk has excellent properties.

In the above Examples 3 to 5 wherein "glycidyl fatty acid ester of" "linseed oil," "soybean oil," and "safflower oil" are mentioned, the glycidyl esters of the fatty acids derived from said oils (not the oils themselves) is the meaning to be given the quoted phrases. Similarly, in examples mentioning "oil modified polymer," the meaning to be given the phrase is that the polymer has been modified by having carboxyl groups esterified by reaction with the glycidyl ester of the specified fatty acid.

I claim:

1. A fluent caulking composition having about 10 to 80 weight percent, solids basis, of an addition polymer having a backbone of copolymerized ethylenically unsaturated monomers, one of which is an unsaturated carboxylic acid monomer, the backbone having the formula:

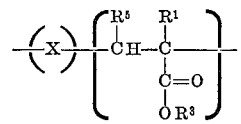

being modified by having pendant ester groups, the modified polymer having units of the following structure:

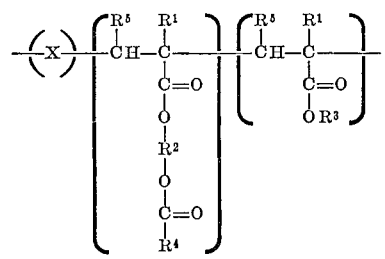

wherein $R^1$ is H, lower alkyl, halogen, —CH$_2$COOR, —COOR, or —CH$_2$COOH, R being lower alkyl of from 1 to 8 carbon atoms;

$R^2$ is —CH$_2$—CH—CH$_2$— or —CH—CH$_2$—;
             |                    |
             OH                   CH$_2$OH $R^3$ being at least one of H, or at least one lower alkyl radical having from 1 to 8 carbon atoms, at least a portion of $R^3$ being H, to give free carboxyl groups;
$R^4$ is an unsaturated, air curable alkyl radical;
$R^5$ is H, —COOH, or —CONH$_2$ or —COOR, wherein R is as above;
X is derived from at least one other vinyl monomer and is optional;

the units in parentheses being in any order, which polymer is derived from the esterification of some of the carboxylic groups in said backbone by at least one unsaturated fatty acid glycidyl ester, the amount of said unsaturated carboxylic acid in the backbone, before modification, being from 0.25 to 25 weight percent on the basis of copolymerized monomers, the molar ratio of free carboxyl groups to glycidyl ester groups, before modification of the backbone, being from about 1:0.9 to 1:0.2, in which the polymer is a rubbery material and the T$_g$ of the backbone polymer free of pendant ester groups is below about 10° C., and a pigment or filler in the amount of about 20 to 90 weight percent on a solids basis.

2. The caulking composition of claim 1 wherein the polymer is such that $R^5$ is H, $R^1$ is H or lower alkyl having 1 to 5 carbons, $R^4$ has about 10 to 22 carbon atoms, the amount of said unsaturated carboxylic acid is from 1 to 5 weight percent of the backbone monomers, no more than about 5 percent by weight of the units having the formula:

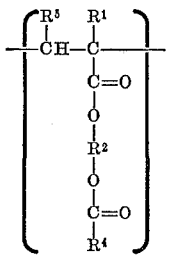

being present in the modified polymer, and said ratio is from 1:017 to 1:0.3.

3. The caulking composition of claim 2 in which the amount of said unsaturated carboxylic acid in the polymer is 1.5 to 3.5 weight percent of said backbone, and said ratio is 1:0.6 to 1:0.4, and the $T_g$ of the backbone polymer free of pendant ester groups is below about 0° C.

4. The caulking composition of claim 3 in which the $T_g$ of said polymer is below −10° C.

References Cited

UNITED STATES PATENTS

| | | | |
|---|---|---|---|
| 3,442,873 | 4/1969 | Vasfer | 260—78.5 |
| 3,366,706 | 11/1968 | Vasfer | 260—834 |
| 3,583,955 | 6/1971 | Holicky | 260—78.4 |
| 3,448,089 | 6/1969 | Aleste | 260—78.5 |
| 3,242,123 | 4/1966 | Mayfield | 260—29.6 |

FOREIGN PATENTS 1,060,711  4/1967  Great Britain.

OTHER REFERENCES

Silane Coupling Agents, Slerman Industrial & Eng. Chemistry, vol. 3, March 1966, p. 3337.

ALLAN LIEBERMAN, Primary Examiner

R. ZAITLEN, Assistant Examiner

U.S. Cl. X.R.

260—41 B, 41 C, 78.5 T, 88.1 PC

UNITED STATES PATENT OFFICE
CERTIFICATE OF CORRECTION

PATENT NO. : 3,786,020
DATED : January 15, 1974
INVENTOR(S) : William D. Emmons

It is certified that error appears in the above-identified patent and that said Letters Patent are hereby corrected as shown below:

In Column 6, line 31, change "o, m, or p" to --$\underline{o}$, $\underline{m}$, or $\underline{p}$--.

In Column 5, line 72, change "1" to --$\underline{1}$--.

In Column 13, following line 22, enter the following:

Claim 5. The composition of claim 2 in which an organic solvent is present, and the polymer is predominantly an ester of acrylic acid and an alkanol having 1 to 4 carbon atoms, with an ester of methacrylic acid and an alkanol having 1 to 4 carbon atoms, methacrylonitrile or acrylonitrile, and methacrylic acid or acrylic acid being present in smaller amounts.

Claim 6. The composition of claim 4 in which an organic solvent is present, and the polymer is predominantly an ester of acrylic acid and an alkanol having 1 to 4 carbon atoms, with an ester of methacrylic acid and an alkanol having 1 to 4 carbon atoms, methacrylonitrile or acrylonitrile, and methacrylic acid or acrylic acid being present in smaller amounts.

Claim 7. The composition of claim 6 having a silane therein.

Signed and Sealed this twenty-ninth Day of July 1975

[SEAL]

Attest:

RUTH C. MASON
Attesting Officer

C. MARSHALL DANN
Commissioner of Patents and Trademarks